(12) United States Patent
Shin

(10) Patent No.: US 6,477,715 B2
(45) Date of Patent: Nov. 12, 2002

(54) DETACHABLE DISPOSABLE SWEATBAND

(76) Inventor: Ku Hyon Shin, 1400 Fairlance Dr., Diamond Bar, CA (US) 91789

( * ) Notice: Subject to any disclaimer, the term of this patent is extended or adjusted under 35 U.S.C. 154(b) by 0 days.

(21) Appl. No.: 09/772,425

(22) Filed: Jan. 29, 2001

(65) Prior Publication Data

US 2002/0100107 A1 Aug. 1, 2002

(51) Int. Cl.[7] .................................................. A42B 1/00
(52) U.S. Cl. .......................... 2/181.4; 2/181; 2/DIG. 11; 2/209.13; 2/182.8
(58) Field of Search .......................... 2/171, 181, 181.4, 2/DIG. 11, 209.13, 181.2, 181.6, 182.8

(56) References Cited

U.S. PATENT DOCUMENTS

| | | | | |
|---|---|---|---|---|
| 5,025,504 A | * | 6/1991 | Benston et al. | 2/181.4 |
| 5,209,801 A | * | 5/1993 | Smith | 156/161 |
| 5,313,668 A | * | 5/1994 | Bogan et al. | 2/181.4 |
| 5,553,326 A | * | 9/1996 | Moore | 2/181 |
| 5,566,395 A | * | 10/1996 | Nebeker | 2/181 |
| 5,613,248 A | * | 3/1997 | Young | 2/181.4 |
| 5,887,284 A | * | 3/1999 | Simmons | 2/181.4 |
| 5,915,534 A | * | 6/1999 | May | 2/181.4 |
| 5,920,910 A | * | 7/1999 | Calvo | 2/181.4 |

* cited by examiner

*Primary Examiner*—Peter Nerbun
*Assistant Examiner*—Katherine Moran
(74) *Attorney, Agent, or Firm*—J. E. McTaggart

(57) ABSTRACT

A detachable disposable sweatband, that can be readily manufactured from inexpensive readily-available component materials at low cost that makes it practically disposable and thus beneficial to personal hygiene, is easily attached to the sweatband or interior periphery of practically any existing headware. A composite central core of special highly-absorptive material, based on basic principles of feminine hygiene pads, accepts and retains more sweat than comparable sweatbands of prior art and thus provides better protection to the eyes and face of the wearer. The sweatband can be easily detached and discarded, and then replaced at low cost whenever desired, thus eliminating the usual inconvenience and cost of laundering or discarding and replacing the headwear.

9 Claims, 2 Drawing Sheets

DETACHABLE DISPOSABLE SWEATBAND

FIELD OF THE INVENTION

The present invention relates to the field of wearing apparel, and more particularly it relates to a detachable and disposable sweatband that can be removably attached to apparel such as headwear for protecting the eyes and face against sweat from strenuous exercise, sports and/or hot/humid weather.

BACKGROUND OF THE INVENTION

For both indoor and outdoor physical activity, it is common to wear a cap of some kind: e.g. a peak cap or sun visor for sun shade and vision purposes. With vigorous exercise and/or in hot/humid weather conditions, perspiration from the head and forehead can be profuse, running down into the eyes and other parts of the face and body to an extent that can range from annoyance, discomfort and disfiguring of ladies' facial cosmetics, to potential serious danger, where control of a moving vehicle, e.g. an automobile, boat or even a bicycle, is placed at risk.

Headwear such as hats, caps and visors are often fitted with a moisture-repellant sweatband whose purpose is only to prevent head sweat from soiling the fabric of the cap. Without such a sweatband, the headwear itself would repeatedly absorb sweat and soon become fouled to an extent that it would at least require cleaning or more likely become worthless and discarded.

Absorbent sweatbands have been known and used; some affixed permanently to the headwear and others removable; however these soon become soiled and require costly laundering or costly replacement of either the sweatband or the entire headwear.

DISCUSSION OF RELATED KNOWN ART

U.S. Pat. No. 5,915,534 to May for a CAP WITH DETACHABLE SWEATBAND discloses a brimless adjustable cap particularly for indoor exercise such as weight-lifting, fitted with a removable semi-circumferential sweatband for absorbing perspiration.

U.S. Pat. No. 4,941,210 to Konucik for a QUICK-CHANGE Sweatband discloses a loop pile fastener adhered permanently to the existing sweatband or garment and a hook pile fastener similarly secured to an absorbent band or pad for engagement with the loop pile fastener.

In the foregoing patents and many others found in prior art the band or pad is intended to be removed for replacement and washing when needed, rather than being disposable. Furthermore sweatbands of prior art are conventionally made from a single layer of material, consequently the capacity for absorbing moisture is very limited, requiring frequent costly replacement and/or laundering.

Prior art replaceable type sweatband structure requires the headgear to be originally manufactured with the necessary attachment provisions and arrangements, and thus are not applicable to or compatible with existing headwear.

A partially-related patent application 2000-017524-4 for a CAP/HAT WITH DETACHABLE SWEAT/MAKE-UP PROTECTION COTTON BAND has been filed by the present inventor, K. H. Shin in the Republic of Korea.

OBJECTS OF THE INVENTION

It is a primary object of the present invention to provide a a sweatband that can be easily installed in the headband region of existing headwear.

It is a further object to make the sweatband inexpensive so that it can be regarded as disposable and economically replaced.

It is a further object to provide the sweatband with greater protection and absorbing capacity than prior art and yet to protect both the user and the attached headwear from any negative effects of sweat accumulated in the sweatband.

It is a further object that the sweatband of the invention may be manufactured from low cost readily available materials procured in roll form, in a simple and preferably continuous fabrication process.

SUMMARY OF THE INVENTION

The abovementioned objects have been accomplished by the present invention of a detachable disposable sweatband that can be readily manufactured, optionally in an automatic process, from readily-available materials at a low cost that makes it practically disposable, that can be easily attached to the sweatband or interior periphery of existing headware, that, due to the use of a special highly-absorbent composite central element, will absorb a greater amount of sweat than comparable sweatbands of prior art and thus provide superior protection to the wearer's eyes and face. One side of the sweatband is provided with a tacky adhesive attachment strip or coating so that it can be easily detached. discarded and replaced.

The simplicity and effectiveness of the sweatband of this invention renders it highly versatile and potentially beneficial in many different fields of usage and endeavor; for example, in processing of foods, nutritional substances, medical products and the like in a clean-room environment, it is extremely important to safely manage head sweat which could otherwise contaminate the products, the wearer's skin, clothing or other items in the clean-room environment.

BRIEF DESCRIPTION OF THE DRAWINGS

The above and further objects, features and advantages of the present invention will be more fully understood from the following description taken with the accompanying drawings in which.

DETAILED DESCRIPTION

Figure 1:
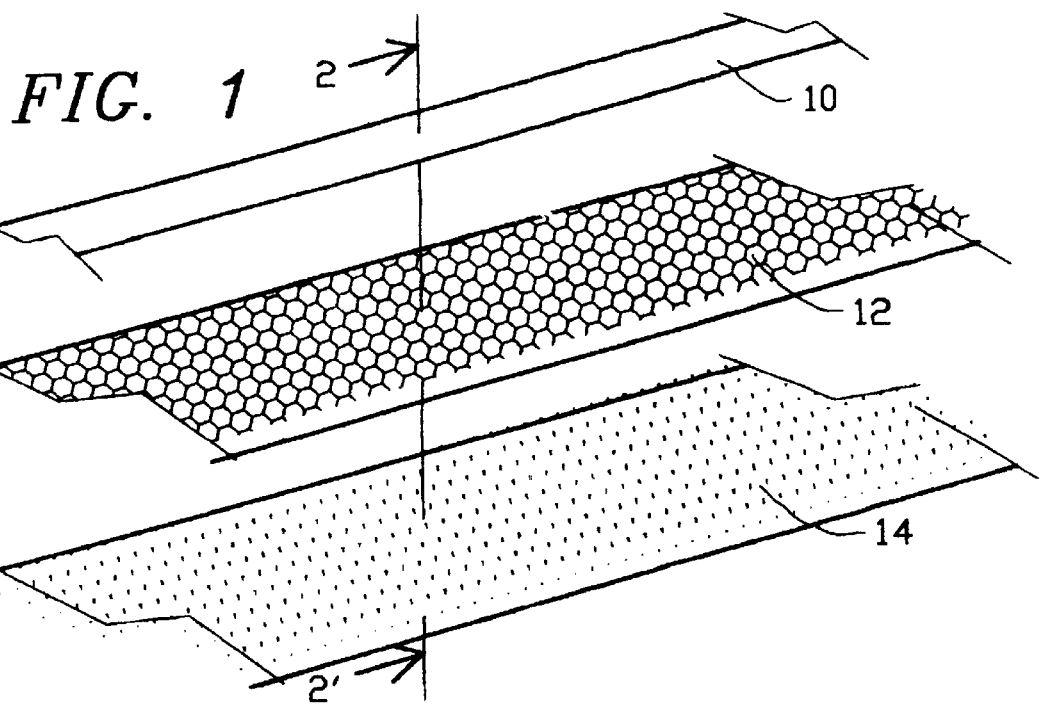
FIG. 1 is a perspective view of the three components of the sweatband in a preferred embodiment of the present invention shown in exploded form prior to assembly.

FIG. 1 is a perspective view of the three components of the sweatband of the present invention shown in exploded form prior to assembly. For large scale production, each of these components is preferably procured in the form of continuous large rolls, from which a continuous length of sweatband may be automatically fabricated in a continuous process, then cut to desired lengths.

Attachment strip 10 is a plastic tape with tacky adhesive on both sides, available from suppliers such as 3M Corporation.

The central core 12 is preferably a multi-layer composite of highly absorbent fibrous materials such as those used in feminine hygiene products, especially formulated to absorb and retain moisture. In a preferred embodiment the core 12 in original strip form has three layers: the top main layer of highly absorptive fibrous material with a nominal density of 40 g/sm, a middle layer of fluff pulp with a density of 37 g/sm and a bottom layer of tissue with a density of 18 g/sm.

The outer sheath 14 is a flexible plastic material, also used in feminine hygiene products; it is made to be water-pervious by a grid pattern of perforations and has the general appearance and feel of woven fabric. The perforations are typically 0.5 mm in diameter and spaced 1.5 mm on centers, The material is somewhat elastic, so it can stretch to accommodate expansion of the central core 12 as it absorbs the sweat moisture.

Figure 2:
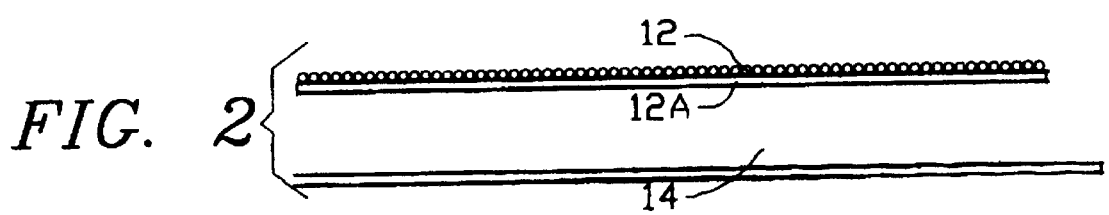
FIG. 2 is a cross-section taken through axis 2–2' of FIG. 1, showing the two main components of the sweatband.

FIG. 2 is a cross-sectional view through axis 2–2' of FIG. 1 showing core 12, with an optional backing strip 12A, and outer sheath 14 having a width somewhat greater than that of the core 12 to allow for overlapping and forming a hem.

Figure 3:
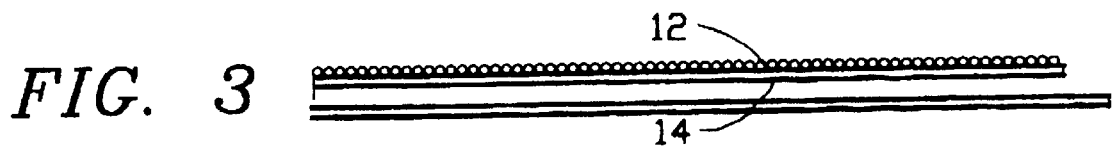
FIG. 3 shows the two components from FIG. 2 stacked together in a first step in a typical fabrication process.

FIG. 3 shows the items from FIG. 2, i.e. core 12 and outer sheath 14, stacked together in a first step in the fabrication process, where, in a continuous process, the two component strips can be fed together each from a continuous rolls, either for storage and further processing as a combined roll, or else fed immediately to the next step in the fabricating process, i.e. folding into a band.

Figure 4:
FIG. 4 shows the stacked components from FIG. 3 folded together to form a band in a second step in the fabrication process.

FIG. 4 shows the composite strip from FIG. 3, containing core 12 and outer sheath 14, folded together to form a band with an overlapping portion of sheath 14 further folded to form a hem as shown. This is performed in s second step in the fabrication process, which could be performed from two separately rolled components as in FIG. 2 or from their rolled combination as in FIG. 3 as part of a continuous process similar to metal extrusion. The width of material is made to yield a finished width dimension of about ⅞ inch (23 mm) for the band.

Since the three layer original strip from FIG. 3, folded over onto itself, becomes effectively a five layer band with a highly absorptive double-thickness central core, sandwiched between the two layers of fluff pulp which in turn are sandwiched between the two layers of tissue. This five layer band has density of 150 g/sm and provides a standard distilled water absorption capacity of 60 g/g. Such composite absorptive material is commercially available identified by Product Code YK-m-150.

Figure 5:
FIG. 5 shows the band from FIG. 4 secured together by sewing in a third step in the fabrication process.

FIG. 5 shows the items from FIG. 4, again core 12 and outer sheath 14, following a third step in the process of fabrication. where the formed headband is stitched together by an industrial sewing machine, the thread 16 being patterned in a zig-zag cross stitch at the top and in a pair of longitudinal stitched-though rows as indicated.

Figure 5A:
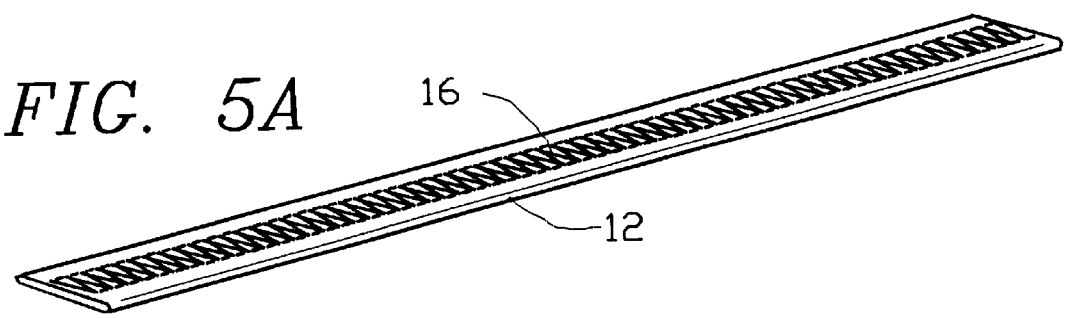
FIG. 5A is a perspective view of a length of sewn band having a cross-section as in FIG. 5, with cross-stitching over the seam. Visible prior to addition of the attachment strip.

FIG. 5A is a perspective view showing a typical length of the band of the present invention having a cross-section as in FIG. 5, the cross-stitching thread 16 being visible prior to addition of attachment tape (10, FIG. 1).

Figure 6:
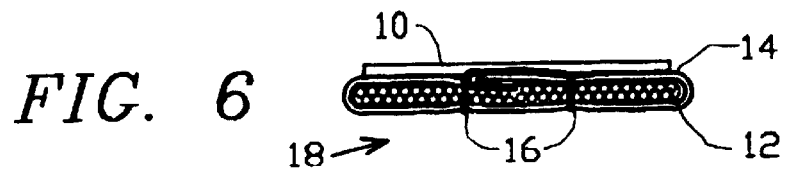
FIG. 6 shows the sewn band from FIGS. 5 and 5A combined with attachment tape from FIG. 1, in a fourth step in the fabrication process to form a sweatband.

FIG. 6 shows a cross-section as in FIG. 5 with the addition of attachment tape 10 from FIG. 1, added in a fourth step in the fabrication process, either continuously from a roll or in precut lengths: typically about 9½ inches (24 cm) for deployment in the front half of the headwear.

Figure 6A:
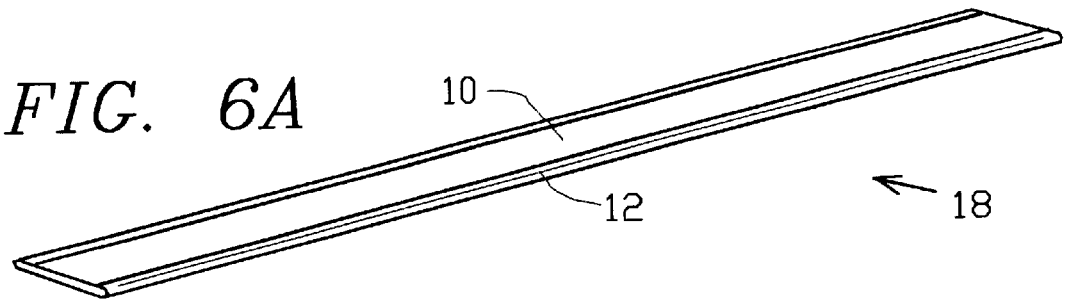
FIG. 6A is perspective view of a length of completed sweatband of the present invention having a cross-section as in FIG. 6.

FIG. 6A is perspective view of a completed sweatband 18 of the present invention including attachment tape 10 as in FIG. 6, The thickness of sweatband 18 in a dry condition is about 3 mm: it is easily compressed to about 1 mm thick, thus it it causes very little interference when added to an existing sweatband in headgear, even in instances where no size adjustment has been provided.

As an alternative to adding attachment strip 10 in a continuous fabrication process and then later cutting the finished band into individual lengths as described above, the stitched band as in FIG. 5 could be cut to individual lengths as in FIG. 5A and then an individual length of attachment strip 10 could be added to each individual length of stitched band to form finished sweatband 18 as in FIGS. 6 and 6A.

Figure 7:
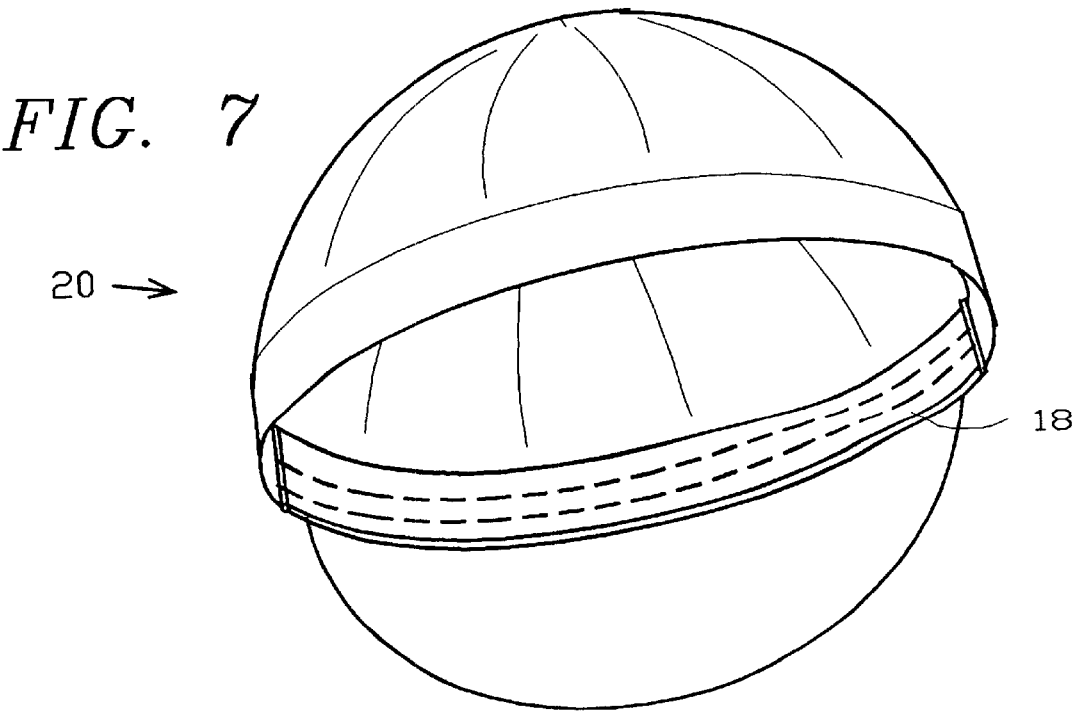
FIG. 7 is a perspective view showing, from the rear, a typical cap fitted with the detachable disposable sweatband of the present invention.

FIG. 7 is a perspective view, taken from the rear, showing a typical cap 20 that has been fitted with the sweatband 18 of the invention, extending approximately half way around the cap 20 located in the front region that would contact the wearer's forehead, forming a seal that absorbs sweat and prevents it from flowing down into the wearer's eyes and other facial regions.

The invention may be embodied and practiced in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

What is claimed:

1. A detachable disposable sweatband, for aftermarket attachment to clothing such as a sweatband in an existing item of headwear for protection of the eyes, face and other body parts of a wearer and surrounding regions of a wearer against sweat from the head and forehead, comprising:
    a central core of highly absorbent material shaped as a flat band;
    at least two layers of fluff pulp, disposed in a manner to substantially surround said central core of highly absorbent material with at least one layer of fluff pulp on each side thereof:
    at least two layers of tissue, disposed in a manner to substantially surround the fluff pulp with at least one layer of tissue on each side, forming a composite core;
    a sheath of flexible and stretchable water-pervious material surrounding said composite core forming a band having a length approximating that of said central core; and
    interfacing means for removably attaching said sweatband to a headband in an item of headwear.

2. The detachable disposable sweatband as defined in claim 1 wherein said interfacing means comprises a strip of flexible material having a first side adhesively attached to a side of the band and a second side coated with a tacky adhesive material for removable attachment to the item of clothing such as a sweatband of existing headwear.

3. The detachable disposable sweatband as defined in claim 1 wherein said interfacing means comprises a layer of tacky adhesive material for removable attachment to the item of clothing such as a sweatband of an existing item of headwear.

4. A detachable disposable sweatband for aftermarket attachment to clothing such as a sweatband in an existing item of headwear for protection of the eyes, face and other body parts of a wearer and surrounding regions of a wearer against sweat from the head and forehead, comprising:

a central core of highly absorbent material shaped as a flat band;

a sheath of flexible and stretchable water-pervious material surrounding said central core forming a band having a length approximating that of said central core, said sheath comprising a soft plastic layer, configured throughout with a grid pattern of apertures, made and arranged to surround and contain said central core while allowing easy transition of sweat moisture to be absorbed and retained by said, central core; and interfacing means for removably attaching said sweatband to a headband in an item of headwear.

5. The detachable disposable sweatband as defined in claim 1 wherein:

said sheath is wrapped around said core in a manner to provide an overlap in a generally central region along the band;

the overlap is folded so as to form a hem; and the hem is secured in place by thread stitched through the band in a sewing operation.

6. A detachable disposable sweatband, for aftermarket insertion into headwear of various kind, for protection of the eyes and face of a wearer of the headware against sweat from the head and forehead, comprising:

a central core of highly absorbent material shaped as a flat strip of predetermined length;

at least two layers of fluff pulp, disposed in a manner to substantially surround said central core of highly absorbent material with at least one layer of fluff pulp on each side thereof, forming a composite core:

a sheath of flexible and stretchable water-pervious material wrapped around said composite core and sewn in place, forming a band having a length approximating that of said core;

a flexible attachment strip having a first side thereof affixed onto a side of the band, providing on a second side thereof an exposed attachment area; and a layer of tacky adhesive material applied to the exposed attachment area of said flexible attachment strip, made and arranged to provide removable attachment to an item of clothing such as a sweatband of an existing item of headwear.

7. A method of fabricating a detachable disposable sweatband, for aftermarket attachment to clothing such as a sweatband in an existing item of headwear for protection of the eyes, face and other body parts of a wearer and surrounding regions of a wearer against sweat from the head and forehead, comprising the steps of:

(a) providing, in roll form, a composite strip having at least a highly absorptive core layer and a water-pervious sheath layer, continuously fed into a folding process;

(b) in the folding process, continuously folding two opposite edges of the composite strip over in a manner to enclose the core layer within the sheath layer, so as to form a band with the core layer surrounded by the sheath layer with opposite edges of the core layer and the sheath layer brought together at a seam located in a central region on a first side of the band;

(c) in a continuous sewing process, stitching the band so as to secure the core layer within the sheath layer;

(d) deploying tacky adhesive means in a continuous process onto the first side of the band for removable attachment to the item of clothing such as a sweatband of existing headwear, thus forming a continuous sweatband; and (e) cutting the continuous sweatband into predetermined lengths.

8. The method of fabricating a detachable disposable sweatband as defined in claim 7 wherein, in step (d):

the tacky adhesive means comprises a flexible attachment strip having a first side made and arranged to serve as a removable attachment area and having a second side made and arranged to serve as an exposed sweatband area; and step (d) comprises the sub-steps of (d1) affixing the attachment strip to the first side of the band in the continuous process and (d2) applying a tacky adhesive material to the first side of the attachment strip so as to provide removable attachment to an item of clothing such as a sweatband of an existing item of headwear.

9. The method of fabricating a detachable disposable sweatband as defined in claim 7 wherein:

step (b) further comprises a substep (b1) further folding an edge of the sheath in a manner to form a hem; and in step (c) the sewing process includes providing a stitched seam alongside the hem and cross-stitching across the hem.

* * * * *